United States Patent
Salvador (10) Patent No.: US 9,852,773 B1
(45) Date of Patent: Dec. 26, 2017

(54) SYSTEMS AND METHODS FOR ACTIVATING SUBTITLES

(71) Applicant: Amazon Technologies, Inc., Reno, NV (US)

(72) Inventor: Stan Weidner Salvador, Tega Cay, SC (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/313,723

(22) Filed: Jun. 24, 2014

(51) Int. Cl.
*H04N 5/92* (2006.01)
*G11B 27/22* (2006.01)

(52) U.S. Cl.
CPC .................... *G11B 27/22* (2013.01)

(58) Field of Classification Search
CPC ................. H04N 2005/44526; H04N 21/4884
USPC .......................................................... 386/245
See application file for complete search history.

(56) References Cited

U.S. PATENT DOCUMENTS

| | | | |
|---|---|---|---|
| 6,408,128 B1 * | 6/2002 | Abecassis ............... | G11B 19/02 348/E5.105 |
| 2010/0146445 A1 * | 6/2010 | Kraut ....................... | H04N 5/60 715/821 |
| 2012/0173235 A1 * | 7/2012 | Mountain ............... | G10L 15/26 704/235 |
| 2013/0196292 A1 * | 8/2013 | Brennen ................ | G09B 19/06 434/157 |
| 2013/0278824 A1 * | 10/2013 | Einarsson ............ | H04N 7/0885 348/468 |

* cited by examiner

*Primary Examiner* — Thai Tran
*Assistant Examiner* — Jose Mesa
(74) *Attorney, Agent, or Firm* — Eversheds Sutherland (US) LLP (57) ABSTRACT

According to one or more embodiments of the disclosure, a method is provided. The method may include executing playback of a video. The method may also include receiving user input to rewind at least one portion of the video. Further, the method may include restarting playback of the video at a previous position before the at least one portion of the video. The method may also include activating subtitles associated with the video during playback of the video from the previous position, wherein the subtitles are displayed during playback of the at least one portion of the video. Additionally, the method may include deactivating subtitles during playback of the video after a predetermined amount of time.

19 Claims, 5 Drawing Sheets

SYSTEMS AND METHODS FOR ACTIVATING SUBTITLES

In some instances, users watching video content may find that certain portions of a video may be difficult to hear or understand. For instance, environmental noise may render a user unable to hear certain dialogue in the video. As another example, the user may be unable to understand a speaker in the video, due to an accent of the speaker and/or other factors in the video. As such, the user may wish to replay these moments with activated subtitles in order to display what is being said.

BRIEF DESCRIPTION OF THE DRAWINGS

FIG. 5 illustrates another flow diagram for activating subtitles in accordance with one or more embodiments of the disclosure Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for activating subtitles, such as during playback of video content (hereinafter referred to generally as "video"). Broadly, the systems and methods described herein may enable the dynamic activation and/or display of subtitles based on user input. For instance, in some embodiments, a user may be watching a playback of video on a user device. The user may experience a portion of the video that the user considers difficult to hear and/or understand. As a result, the user may, at a current position in the playback of the video, press a button on a remote control and/or input a selection via a user interface displayed by the user device. The button press and or user interface selection (hereinafter referred to collectively as a "restart selection") may result in playback of the video being restarted at a previous position before the current position. In some cases, the previous position may be a predetermined amount of playback time before the current position. Thus, in view of the above, the restart selection may, in effect, provide an indication that a portion of the video is difficult to hear and/or understand.

Furthermore, in response to the restart selection, the user device may also be configured to activate subtitles to be displayed during the playback restart of the video from the previous position. As a result, the subtitles may be displayed during playback of the portion of the video that the user found difficult to hear and/or understand. Additionally, according to some implementations, the user device may be configured to deactivate the subtitles after a predetermined amount of playback time has elapsed since activating the subtitles.

Additionally, the systems and methods described herein may enable the automatic activation and/or display of subtitles based at least in part on subtitle activation data associated with the video. In certain implementations, the user device may receive subtitle activation data dynamically, such as from a restart selection as described above. Other dynamic subtitle activation data may include but are not limited to, data related to environmental noise, data associated with a current playback volume of a video, voice recognition of one or more viewers during playback of the video, and/or the like.

In other implementations, subtitle activation data may include previously determined information associated with the video. For instance, a service provider server may determine one or more playback ranges of a video in which subtitles are to be activated and/or displayed. These playback ranges may be included in the subtitle activation data, and in some implementations, the subtitle activation data may be stored on the service provider server. When executing playback of the video, the user device may be configured to access the subtitle activation data from the service provider server. To this end, when playback of the video reaches the playback ranges indicated by the subtitle activation data, the user device may be configured to automatically activate and/or display subtitles for those respective playback ranges.

According to some embodiments, the subtitle activation data may be generated, updated, and/or otherwise determined based at least in part on feedback analysis data associated with the video. Feedback analysis data may include, but is not limited to, user feedback data, subtitle transcript data, speech recognition data, or environment audio data. For example, in certain implementations, a remote control may be in communication with the user device to control playback of a video by the user device. Furthermore, the remote control may include a replay button or other selectable component, that when selected, may restart playback of the video from a previous position in the video and activate subtitles for a predetermined amount of time. To this end, user feedback data may indicate, for respective portions of a video, a number of user replay selections. The number of replay selections may indicate a number of times users and/or user devices have selected the replay button to replay and activate subtitles for those respective portions of the video. This user feedback data may be continually updated and stored by a service provider server. Additionally, the service provider server may be configured to determine whether certain portions of the video are associated with a number of replay selections greater than or equal to a replay number threshold. If so, the service provider server may generate and/or update subtitle activation data to indicate that subtitles are to be activated and/or displayed during playback of those portions of the video.

Figure 1:
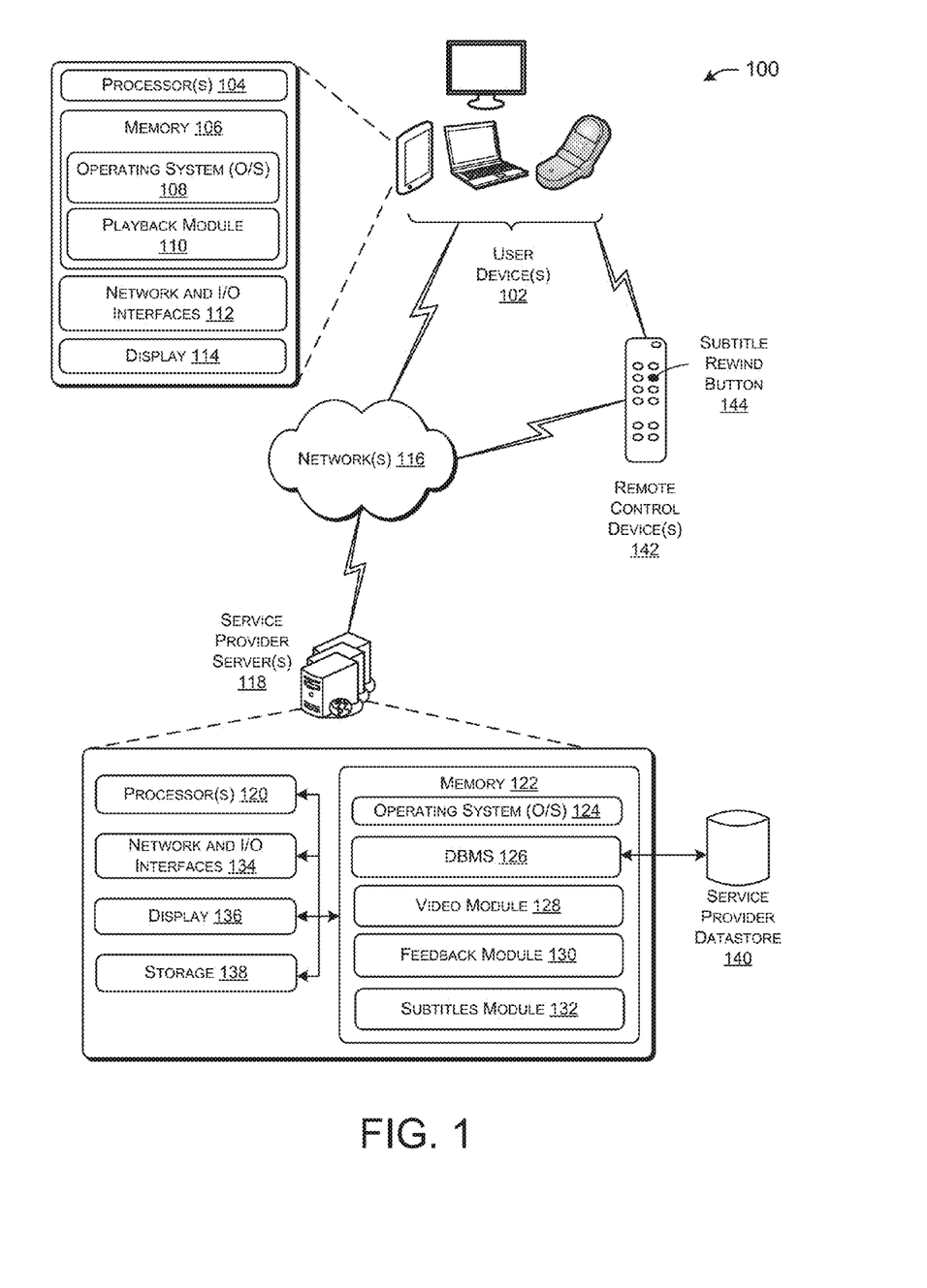
FIG. 1 illustrates a system for activating subtitles in accordance with one or more embodiments of the disclosure.

With reference now to FIG. 1, a system 100 for activating subtitles is shown according to one or more embodiments of the disclosure. The system 100 may include one or more user device(s) 102 and one or more service provider servers 118 configured to exchange data via one or more networks 116. The network(s) 116 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 116 may have any suitable communication range associated therewith and may include, for example, global networks (e.g., the Internet), metropolitan area networks (MANs), wide area networks (WANs), local area networks (LANs), or personal area networks (PANs). In addition, the network(s) 116 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In general, the user device 102 may refer to any type of electronic device, and more particularly, may refer to one or more of the following: a wireless communication device, a portable electronic device, a telephone (e.g., cellular phone, smart phone), a computer (e.g., laptop computer, tablet computer), a wearable computing device, a portable media player, a personal digital assistant (PDA), a television, or any other electronic device having a networked capability. In an illustrative configuration, the user device(s) 102 may include one or more computer processors 104, a memory 106 storing an operating system 108 and a playback application 110, network and I/O interfaces 112, and a display 114. In certain embodiments, the user device(s) 102 may include one or more sensors capable of gathering information associated with a present environment of the user device(s) 102, or similar hardware devices, such as a camera, microphone, antenna, or Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 104 and one or more of the other components of the user device 102. The one or more processors 104 may also include one or more application-specific integrated circuits (ASICs) or application-specific standard products (ASSPs) for handling specific data processing functions or tasks.

The memory 106 may comprise one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the user device 102. The operating system 108 may include any operating system now known or which may be developed in the future including, but not limited to, any server operating system, any mainframe operating system, or any other proprietary or freely available operating system. The memory 106 may also store content that may be displayed by the user device 102 or transferred to other devices (e.g., headphones) to be displayed or played by the other devices. The memory 106 may also store content received from the other devices. The content from the other devices may be displayed, played, or used by the user device 102 to perform any necessary tasks or operations that may be implemented by the computer processor or other components in the user device 102.

Furthermore, the memory 106 may store a playback module 110 to facilitate playback of various media content that may be provided to the user device 102, such as by the service provider server(s) 118. For instance, the playback module 110 may include a video player application configured to play video and/or other media content associated with various types of media files. As another example, the playback module 110 may be included as part of a web browser (not pictured).

The network and I/O interfaces 112 may also comprise one or more communication interfaces or network interface devices to provide for the transfer of data between the user device 102 and another device (e.g., network server) via a network (e.g., one or more of the network(s) 116). The communication interfaces may include, but are not limited to, a computer port that may provide an interface to other devices or peripherals, a network interface controller for connecting to a network (e.g., one or more of network(s) 116), a network interface device, a network socket that may provide a software interface to a network, a networking port that may provide a protocol interface to a network, or the like. The user device 102 may be coupled to one or more of the network(s) 116 via a wired connection. The user device 102 may further include one or more wireless system interfaces that may include suitable hardware and software for broadcasting and receiving messages either using, for example, the Wi-Fi Direct Standard (see Wi-Fi Direct specification published in October 2010), any of the IEEE 802.11 wireless standards (see IEEE 802.11-2007, published Mar. 8, 2007; IEEE 802.11n-2009, published October 2009), or combinations thereof. The wireless system interfaces (not shown) may include a transmitter and a receiver or a transceiver (not shown) capable of operating in a broad range of operating frequencies specified in the IEEE 802.11 wireless standards. The communication interfaces may utilize acoustic, radio frequency, optical, or other signals to exchange data between the user device 102 and another device such as an access point, a host computer, a server, a router, a reader device, and the like. In addition, the network and I/O interfaces 112 may include one or more interfaces for establishing communication with one or more peripheral devices such as, for example, a mouse, keyboard, microphone, camera, webcam, speaker, or the like.

The display 114 may include, but is not limited to, a liquid crystal display, a light-emitted diode display, an E-Ink™ display as made by E Ink Corp. of Cambridge, Mass., or any other similar type of output device. The display 114 may be used to show content to a user in the form of text, images, or video. In certain instances, the display 114 may also operate as a touch screen display that may enable the user to initiate commands or operations by touching the screen using certain finger or hand gestures.

As previously discussed, the memory 106 may store a playback module 110. In some implementations, the playback module 110 may be configured to receive subtitle activation data associated with a video. The subtitle activation data may include an indication of one or more portions of the video for which subtitles are to be activated and/or displayed. For example, the subtitle activation data may indicate a first portion of the video to be displayed with subtitles activated. As such, the subtitle activation data may cause the first portion of the video to be presented with subtitles and respective portions of the video before and after the first portion to be presented without subtitles.

In certain embodiments, the subtitle activation data may include one or more input commands that may be received via, for example, a remote control device 142. For instance, the remote control device 142 may include a subtitle rewind button 144. To this end, while a user device 102 is playing a video at a current position, a user may press the subtitle rewind button 144, which may transmit a subtitle rewind command signal to the user device 102. Upon receipt of the command signal, the playback module 110 may be configured to restart playback of the video at a previous position before the current position, and to activate the display of subtitles associated with the video at the previous position. In some embodiments, the previous position may be a first predetermined amount of playback time before the current position (e.g., 7 seconds of playback time in the video before the current position). Furthermore, the playback module 110 may be configured to deactivate the display of the subtitles after a second predetermined amount of playback time (e.g., at least the same amount of playback time as the first predetermined amount of playback time). In other example embodiments, the amount of playback time during which subtitles may be activated may be configurable by a user of the user device 102. Thus, the subtitle rewind button 144 may enable a user to replay a previous portion of a video currently being watched and to display subtitles during the replay of that portion. As a result, if the user decides during playback of a video that a recent portion of the video was difficult to hear and/or understand, the user may press the subtitle rewind button 144 in order to replay the recent portion with subtitles.

It will be appreciated that the functionality provided by the subtitle rewind button 144 on the remote control device 142 may also be provided by other means. For instance, the playback module 110 may be configured to display a user interface to the user during playback of a video. The user interface may include a selectable component, which upon selection (e.g., a touch input on a touch screen of the display 114), may restart playback of the video at a previous position and activate subtitles associated with the video at the previous position. In other implementations, the playback module 110 may be configured to receive one or more voice commands (e.g., "What did he/she say?") and perform a corresponding function in response thereto (e.g., restart playback of the video at a previous position and activate subtitles associated with the video at the previous position).

According to one or more embodiments, the playback module 110 may also be configured to access subtitle activation data from one or more service provider servers 118. For instance, the playback module 110 may request the video from a service provider server 118. In response, the service provider server 118 may transmit the video, and subtitle activation data associated with the video, which may be received by the playback module 110 via one or more network interfaces 112. The subtitle activation data may indicate one or more portions (e.g., playback ranges) of the video in which subtitles are to be activated and/or displayed. For example, the subtitle activation data may include one or more annotations of the video that indicate respective playback times at which subtitles are to be activated and/or deactivated. To this end, during playback of the video, the playback module 110 may use the subtitle activation data to activate subtitles for the one or more portions indicated by the subtitle activation data.

According to other embodiments, the subtitle activation data may include information received via a microphone and/or any other type of acoustic recording device associated with the user device 102, such as environmental audio signals. To this end, the playback module 110 may be configured to compare a first characteristic of the environmental audio signals to a second characteristic of audio associated with the video. Based on this comparison, the playback module 110 may determine that one or more portions of the video are difficult to hear. For instance, the playback module 110 may be configured to activate the microphone during playback of the video. As such, the microphone may be configured to receive environmental audio signals associated with an environment (e.g., a room) in which the user device 102 may be located. The environmental audio signals may include audio signals associated with the playback of a video (e.g., audio output via speakers associated with the user device 102) as well as audio signals produced by other devices and/or objects in the environment. To this end, the playback module 110 may determine, based on the environmental audio signals received via the microphone, an environmental noise level during playback of a first portion of the video.

In certain implementations, in order to determine the environmental noise level, the playback module 110 may use acoustic echo cancellation. For example, the playback module 110 may compare the environmental audio signals to audio data associated with the first portion of the video. As part of the comparison, the playback module 110 may identify, based on the audio data, the corresponding audio signals that the user device 102 provided to an output component (e.g., speakers) during playback of the first portion of the video. Thereafter, the playback module 110 may be configured to subtract or otherwise eliminate or reduce an intensity of the corresponding audio signals from the environmental audio signals received by the microphone during the same time period. The remaining audio signals may represent an environmental noise level associated with a time period during playback of the first portion of the video.

In some implementations, the playback module 110 may determine that the environmental noise level is greater than (or greater than or equal to) a first environmental noise threshold. As a result, the playback module 110 may be configured to automatically activate subtitles to be displayed during playback of the video going forward. In other implementations, the playback module 110 may be configured to automatically restart playback of the video at a previous position (e.g., the beginning of the first portion of the video). In addition, the playback module 110 may be configured to automatically activate subtitles during playback of the video from the previous position. Moreover, the playback module 110 may be configured to deactivate the subtitles after a predetermined amount of playback time has elapsed. In certain implementations, the playback module 110 may be configured to deactivate the subtitles after determining that the environmental noise level is less than (or less than or equal to) a second environmental noise threshold (which may be the same or different than the first environmental noise threshold).

Furthermore, in certain embodiments, the playback module 110 may also be configured to determine, based at least in part on video data associated with a video, that one or more of textual or graphical content is to be shown in a display area of the display 114 during playback of a particular portion of the video. For instance, certain video content (e.g., movies, TV shows, etc.) may be associated with captions, signs, and/or other textual or graphical images intended to be displayed to viewers during presentation of the video. Additionally, the playback module 110 may determine that subtitles are activated during payback of the particular portion of the video. To this end, the playback module 110 may be configured to display the subtitles in a different display area from the display area of the other textual or graphical content.

According to other implementations, the subtitle activation data may include information associated with a volume level associated with playback of the video. As such, the playback module 110 may be configured to determine, based at least in part on the subtitle activation data a current volume level with respect to playback of the video. In certain implementations, the playback module 110 may also determine that the current volume level is less than (or less than or equal to) a volume threshold. As a result, the playback module 110 may be configured to activate subtitles. Additionally, the subtitle activation data may include user input to increase a volume level associated with playback of the video. To this end, the playback module 110 may determine whether the volume level increase amount is greater than (or greater than or equal to) a volume increase threshold, which may indicate that the user finds the video difficult to hear. Thus, in some implementations, the playback module 110 may activate subtitles in response to the volume level increase amount being greater than (or greater than or equal to) a volume increase threshold.

According to one or more embodiments, the user device 102 may be in communication, via one or more of the network(s) 116, with one or more service provider server(s) 118. As used herein, unless otherwise specified, the term "server" may refer to any computing device having a networked connectivity and configured to provide one or more services to clients, such as a user device 102. The services may include storage of data or any kind of data processing.

As such, the service provider server(s) 118 may include one or more processors 120 and a memory 122. The memory 122 may store an operating system 124, a database management system (DBMS) 126, a video module 128, a feedback module 130, and a subtitles module 132. In addition, the service provider server(s) 118 may also include network and I/O interfaces 134, a display 136, and storage 138. Furthermore the DBMS 126 may be in communication with a service provider datastore 140. While any of the above mentioned components in the user device 102 and the service provider server(s) 118 may hereinafter be referred to in the singular, it will be appreciated that any future references to these components also contemplate a plural number of any such component.

The processors 120 may comprise one or more cores and may be configured to access and execute (at least in part) computer-readable instructions stored in the memory 122. The one or more computer processors 120 may include, without limitation (and similarly to the processors 104 in the user device 102), a CPU, DSP, RISC, CISC, a microprocessor, a microcontroller, a field programmable gate array (FPGA), or any combination thereof. The service provider server 118 may also include a chipset (not shown) for controlling communications between the one or more processors 120 and one or more of the other components of the service provider server 118. The one or more processors 120 may also include one or more application-specific integrated circuits (ASICs) or application-specific standard products (ASSPs) for handling specific data processing functions or tasks.

The memory 122 may comprise one or more computer-readable storage media (CRSM). Similar to the memory 106 in the user device 102, the memory 122 may include non-transitory media such as RAM, flash RAM, magnetic media, optical media, solid state media, and so forth. The memory 122 may be volatile or non-volatile and may also be provided as a computer program product including a transitory machine-readable signal (in compressed or uncompressed form). Additionally, the memory 122 may store an operating system 124 that includes a plurality of computer-executable instructions that may be implemented by the computer processor(s) 120 to perform a variety of tasks to operate the interface(s) and any other hardware installed on the service provider server 118. The operating system 124 may include any operating system now known or which may be developed in the future including, but not limited to, any server operating system, any mainframe operating system, or any other proprietary or freely available operating system.

It should be appreciated that any data and/or computer-executable instructions stored in the memory 122 may be additionally, or alternatively, stored in the data storage 138 and/or in one or more other datastores. The DBMS 126 depicted as being loaded into the memory 122 may support functionality for accessing, retrieving, storing, and/or manipulating data stored in external datastore(s) (e.g., the service provider datastore(s) 140), data stored in the memory 122, and/or data stored in the data storage 138. For example, the DBMS 126 may be configured to retrieve user account data (e.g., information related to items, media files, users, feedback data, etc.) from service provider datastore(s) 140 responsive to receipt of the request from the service provider server 118. The DBMS 126 may use any of a variety of database models (e.g., relational model, object model, etc.) and may support any of a variety of query languages.

The network and I/O interfaces 134 may also comprise one or more communication interfaces or network interface devices to provide for the transfer of data between the service provider server 118 and another device (e.g., the user device 102) via one or more of the network(s) 116. The communication interfaces may include, but are not limited to, any of the types of interfaces described in reference to the network interface 112 of the user device 102. The service provider server 118 may be coupled to one or more of the network(s) 116 via a wired connection and/or a wireless connection. The communication interfaces may utilize acoustic, radio frequency, optical, or other signals to exchange data between the service provider server 118 and another device such as an access point, a host computer, a server, a router, a reader device, and the like.

The display 136 may include, but is not limited to, a liquid crystal display, a light-emitted diode display, an E-Ink™ display as made by E Ink Corp. of Cambridge, Mass., or any other similar type of output device. The display 136 may be used to show content to a user in the form of text, images, or video. In certain instances, the display 136 may also operate as a touch screen display that may enable the user to initiate commands or operations by touching the screen using certain finger or hand gestures.

The service provider server 118 may further comprise storage 138, such as removable storage and/or non-removable storage including, but not limited to, magnetic storage, optical disk storage, and/or tape storage. Storage 138 may provide non-transient storage of computer-executable instructions and other data. The storage 138 may include storage that is internal and/or external to the user service provider server 118.

As previously mentioned, the memory 122 may store a video module 128, a feedback module 130, and a subtitles module 132. In general terms, these various modules may communicate with each other and/or with the user device 102 to facilitate the activation of subtitles during playback of a video. According to some embodiments, the video module 128 may be configured to receive, from the user device 102, a request for a video to be played back on the user device 102. In response, the video module 128 may transmit the video to the user device 102 for playback. In some implementations, the video module 128 may also be configured to transmit, to the user device 102, subtitle activation data associated with the video. As previously discussed, the subtitle activation data may indicate one or more portions of the video for which subtitles are to be activated and/or displayed.

To this end, the feedback module 130 and the subtitle module 132 may be configured to generate the subtitle activation data based on various feedback data. For example, the feedback module 130 may be configured to receive feedback data associated with the video, such as from one or more user devices 102. In general, the feedback data may identify one or more portions of the video that a user found difficult to hear and/or understand. Furthermore, the feedback module 130 may provide the feedback data to the subtitle module 132, which may use the feedback data to determine whether one or more portions of the video should be played back with activated subtitles. As such, the subtitle module 132 may be configured to generate, based at least in part on the feedback data, the subtitle activation data.

For instance, in certain implementations, the feedback data may indicate a number of user replay selections to replay various portions of the video with activated subtitles (e.g., a number of times users clicked the subtitle rewind button 144 for different portions of the video). If the number of user replay selections for a particular portion of the video is greater than (or greater than or equal to) a selection threshold, the subtitle module 132 may be configured to generate and/or update the subtitle activation data to indicate that subtitles are to be activated during playback of the particular portion of the video.

In other implementations, the subtitle module 132 may generate and/or update subtitle activation data based at least in part on performing automatic speech recognition on audio corresponding to a portion of the video and comparing results of the speech recognition (e.g., speech recognition data) with subtitles corresponding to the portion of the video. For example, subtitle transcript data may include data associated with the text of the subtitles associated with the video. As such, the subtitle module 132 may generate and/or otherwise determine, via performing speech recognition on the video (e.g., via a speech-to-text application), speech recognition data associated with the video and/or a portion thereof. To this end, the subtitle module 132 may be configured to compare the speech recognition data to the subtitle transcript data. Based on the comparison, the subtitle module 132 may be configured to determine one or more portions and/or playback ranges of the video that are difficult to hear (e.g., determining that one or more portions of the speech recognition data fail to match one or more portions of the subtitle transcript data). These portions and/or playback ranges may be used to generate and/or update the subtitle activation data.

It will be further appreciated that while FIG. 1 illustrates the service provider server 118 as including various modules, in other embodiments, such modules may be distributed among different servers and/or other devices in communication with each other. In other words, the service provider server 118 may be a collection of multiple servers that perform any combination of the functions of the modules illustrated in the service provider server 118. In some implementations, the functionality described with respect to the service provider server 118 may also be performed at least in part by the user device 102.

Figure 2:
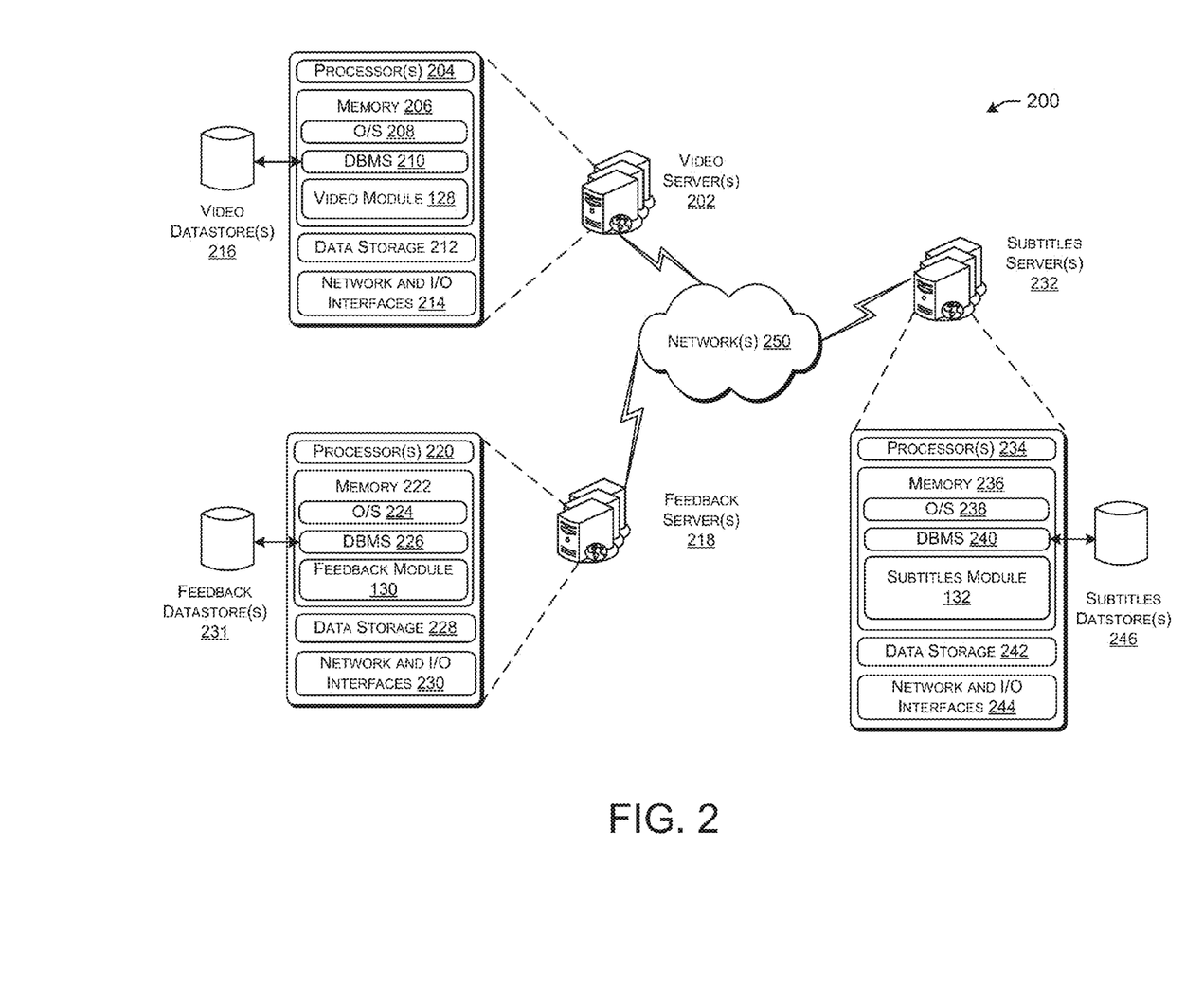
FIG. 2 illustrates a system for activating subtitles in accordance with one or more embodiments of the disclosure.

For example, FIG. 2 illustrates a system 200 that includes a video server 202, a feedback server 218, and a subtitles server 232 in communication with each other through one or more networks 250. According to certain embodiments, these servers may collectively perform the functions described above with reference to the service provider server 118 of FIG. 1. The network(s) 250 may include any of the example types of networks described with reference to the network(s) 116.

The video server 202 may include one or more processors 204, one or more memory devices 206 (generically referred to herein as memory 206), data storage 212, and one or more network and I/O interface(s) 214. For ease of explanation, the video server 202 will be referred to hereinafter in the singular. However, it should be appreciated that multiple video servers 202 may be provided.

The processor(s) 204 may be configured to access the memory 206 and execute computer-executable instructions stored therein. For example, the processor(s) 204 may be configured to execute computer-executable instructions of the various program modules of the video server 202 to cause or facilitate various operations to be performed in accordance with one or more embodiments of the disclosure. The processor(s) 204 may include any suitable processing unit capable of accepting data as input, processing the input data in accordance with stored computer-executable instructions, and generating output data. The processor(s) 204 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The memory 206 may include volatile memory such as random access memory (RAM) and/or non-volatile memory such as read-only memory (ROM), flash memory, and so forth. In various implementations, the memory 206 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 206 may store computer-executable instructions that are loadable and executable by the processor(s) 204, as well as data manipulated and/or generated by the processor(s) 204 during the execution of the computer-executable instructions. For example, the memory 206 may store one or more operating systems (O/S) 208; one or more database management systems (DBMS) 210; and one or more program modules, applications, or the like such as, for example, one or more video module(s) 128. The various illustrative program modules depicted as being loaded into the memory 206 may include computer-executable instructions that, responsive to execution, may cause various processing to be performed. In order to perform such processing, the program modules may utilize various data stored in the memory 206, in the data storage 212, and/or in one or more external datastores, such as video datastore(s) 216.

The (O/S) 208 loaded into the memory 206 may provide an interface between other application software executing on the video server 202 and the hardware resources of the video server 202. More specifically, the O/S 208 may include a set of computer-executable instructions for managing hardware resources of the video server 202 and for providing common services to other application programs (e.g., managing memory allocation among various application programs). The O/S 208 may include any operating system now known or which may be developed in the future including, but not limited to, any server operating system, any mainframe operating system, or any other proprietary or freely available operating system.

It should be appreciated that any data and/or computer-executable instructions stored in the memory 206 may be additionally, or alternatively, stored in the data storage 212 and/or in one or more other datastores. The DBMS 210 depicted as being loaded into the memory 206 may support functionality for accessing, retrieving, storing, and/or manipulating data stored in external datastore(s) (e.g., one or more video datastores 216), data stored in the memory 206, and/or data stored in the data storage 212. For example, the DBMS 210 may be configured to retrieve user account data (e.g., inventory associated with the user account) from the video datastore(s) 216 responsive to receipt of the request from the video server 202. The DBMS 210 may use any of a variety of database models (e.g., relational model, object model, etc.) and may support any of a variety of query languages.

As previously noted, the network and I/O interfaces 214 may also comprise one or more communication interfaces or network interface devices to provide for the transfer of data between the video server 202 and another device (e.g., the subtitle server 232, the feedback server 218, etc.) via one or more of the network(s) 250. The communication interfaces may include, but are not limited to, any of those previously described. The video server 202 may be coupled to one or more of the network(s) 250 via a wired connection and/or a wireless connection. The communication interfaces may utilize acoustic, radio frequency, optical, or other signals to exchange data between the video server 202 and another device such as an access point, a host computer, a server, a router, a reader device, and the like.

Referring now to other components of the system 200, the feedback server 218 may include one or more processors 220, one or more memory devices 222 (generically referred to herein as memory 222), data storage 228, and one or more network and I/O interface(s) 230. For ease of explanation, the feedback server 218 will be referred to hereinafter in the singular. However, it should be appreciated that multiple feedback servers 218 may be provided.

The processor(s) 220 may be configured to access the memory 222 and execute computer-executable instructions stored therein. For example, the processor(s) 220 may be configured to execute computer-executable instructions of the various program modules of the feedback server 218 to cause or facilitate various operations to be performed in accordance with one or more embodiments of the disclosure. The processor(s) 220 may include any suitable processing unit capable of accepting digital data as input, processing the input data in accordance with stored computer-executable instructions, and generating output data. The processor(s) 220 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The memory 222 may include volatile memory such as random access memory (RAM) and/or non-volatile memory such as read-only memory (ROM), flash memory, and so forth. In various implementations, the memory 222 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 222 may store computer-executable instructions that are loadable and executable by the processor(s) 220, as well as data manipulated and/or generated by the processor(s) 220 during the execution of the computer-executable instructions. For example, the memory 222 may store one or more operating systems (O/S) 224; one or more database management systems (DBMS) 226; and one or more program modules, applications, or the like such as, for example, one or more feedback modules 130. The various illustrative program modules depicted as being loaded into the memory 222 may include computer-executable instructions that, responsive to execution, may cause various processing to be performed. In order to perform such processing, the program modules may utilize various data stored in the memory 222, in the data storage 228, and/or in one or more external datastores, such as feedback datastore(s) 231.

The O/S 224 loaded into the memory 222 may provide an interface between other application software executing on the feedback server 218 and the hardware resources of the feedback server 218. More specifically, the O/S 224 may include a set of computer-executable instructions for managing the hardware resources of the feedback server 218 and for providing common services to other application programs (e.g., managing memory allocation among various application programs). The O/S 224 may include any operating system now known or which may be developed in the future including, but not limited to, any server operating system, any mainframe operating system, or any other proprietary or freely available operating system.

It should be appreciated that any data and/or computer-executable instructions stored in the memory 222 may be additionally, or alternatively, stored in the data storage 228 and/or in one or more other datastores. The DBMS 226 depicted as being loaded into the memory 222 may support functionality for accessing, retrieving, storing, and/or manipulating data stored in external datastore(s) (e.g., the feedback datastore(s) 231), data stored in the memory 222, and/or data stored in the data storage 228. For example, the DBMS 226 may be configured to retrieve user account data (e.g., feedback data, and/or the like associated with the user account) from feedback datastores 231 responsive to receipt of the request from the feedback server 218. The DBMS 226 may use any of a variety of database models (e.g., relational model, object model, etc.) and may support any of a variety of query languages.

As previously noted, the network and I/O interfaces 230 may also comprise one or more communication interfaces or network interface devices to provide for the transfer of data between the feedback server 218 and another device (e.g., the video server 202, the subtitles server 232, etc.) via one or more of the network(s) 250. The communication interfaces may include, but are not limited to, any of those previously described. The feedback server 218 may be coupled to one or more of the network(s) 250 via a wired connection and/or a wireless connection. The communication interfaces may utilize acoustic, radio frequency, optical, or other signals to exchange data between the feedback server 218 and another device such as an access point, a host computer, a server, a router, a reader device, and the like.

Referring now to other components of the system 200, the subtitles server 232 may include one or more processors 234, one or more memory devices 236 (generically referred to herein as memory 236), data storage 242, and one or more network and I/O interface(s) 244. For ease of explanation, the subtitles server 232 will be referred to hereinafter in the singular. However, it should be appreciated that multiple subtitles servers 232 may be provided.

The processor(s) 234 may be configured to access the memory 236 and execute computer-executable instructions stored therein. For example, the processor(s) 234 may be configured to execute computer-executable instructions of the various program modules of the subtitles server 232 to cause or facilitate various operations to be performed in accordance with one or more embodiments of the disclosure. The processor(s) 234 may include any suitable processing unit capable of accepting digital data as input, processing the input data in accordance with stored computer-executable instructions, and generating output data. The processor(s) 234 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The memory 236 may include volatile memory such as random access memory (RAM) and/or non-volatile memory such as read-only memory (ROM), flash memory, and so forth. In various implementations, the memory 236 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 236 may store computer-executable instructions that are loadable and executable by the processor(s) 234, as well as data manipulated and/or generated by the processor(s) 234 during the execution of the computer-executable instructions. For example, the memory 236 may store one or more operating systems (O/S) 238; one or more database management systems (DBMS) 240; and one or more program modules, applications, or the like such as, for example, one or more subtitles module(s) 132. The various illustrative program modules depicted as being loaded into the memory 236 may include computer-executable instructions that, responsive to execution, may cause various processing to be performed. In order to perform such processing, the program modules may utilize various data stored in the memory 236, in the data storage 242, and/or in one or more external datastores, such as subtitles datastore(s) 246.

The O/S 238 loaded into the memory 236 may provide an interface between other application software executing on the subtitles server 232 and the hardware resources of the subtitles server 232. More specifically, the O/S 238 may include a set of computer-executable instructions for managing hardware resources of the subtitles server 232 and for providing common services to other application programs (e.g., managing memory allocation among various application programs). The O/S 238 may include any operating system now known or which may be developed in the future including, but not limited to, any server operating system, any mainframe operating system, or any other proprietary or freely available operating system.

It should be appreciated that any data and/or computer-executable instructions stored in the memory 236 may be additionally, or alternatively, stored in the data storage 242 and/or in one or more other datastores. The DBMS 240 depicted as being loaded into the memory 236 may support functionality for accessing, retrieving, storing, and/or manipulating data stored in external datastore(s) (e.g., the subtitles datastore(s) 246), data stored in the memory 236, and/or data stored in the data storage 242. For example, the DBMS 240 may be configured to retrieve user account data (e.g., subtitles data, feedback data, and/or the like associated with items and/or users) from subtitles datastores 246 responsive to receipt of the request from the subtitles server 232. The DBMS 240 may use any of a variety of database models (e.g., relational model, object model, etc.) and may support any of a variety of query languages.

As previously noted, the network and I/O interfaces 244 may also comprise one or more communication interfaces or network interface devices to provide for the transfer of data between the subtitles server 232 and another device (e.g., the video server 202, the feedback server 218, etc.) via one or more of the network(s) 250. The communication interfaces may include, but are not limited to, any of those previously described. The subtitles server 232 may be coupled to one or more of the network(s) 250 via a wired connection and/or a wireless connection. The communication interfaces may utilize acoustic, radio frequency, optical, or other signals to exchange data between the subtitles server 232 and another device such as an access point, a host computer, a server, a router, a reader device, and the like.

Figure 3:
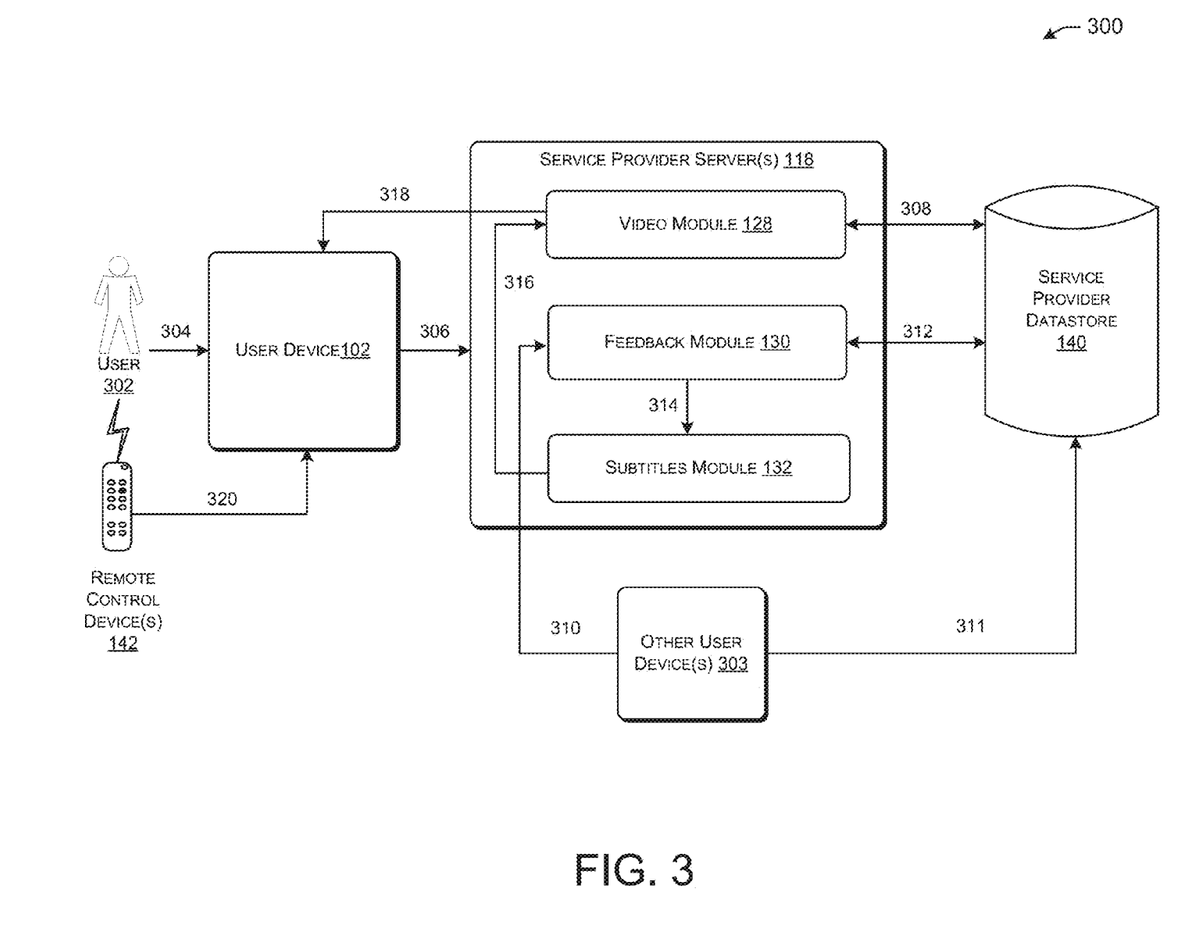
FIG. 3 illustrates a block diagram of a data flow for activating subtitles in accordance with one or more embodiments of the disclosure.

Referring now to FIG. 3, a block diagram of a data flow 300 for activating subtitles is illustrated according to one or more example embodiments. According to the data flow 300, a user 302 may provide an indication 304 to the user device 102 to watch a video that may be provided by a service provider server 118. As such, the user device 102 may transmit, to the service provider server(s) 118, a request 306 for the video.

In response to the request, 306, the video module 128 may be configured to access 308 the video from a service provider datastore 140. For instance, the request may include a video identifier associated with the video, and the video module 128 may use the video identifier to identify the corresponding video in the service provider datastore 140. Furthermore, the feedback module 130 may be configured to receive 310 feedback data from one or more other user device(s) 303. In some implementations, the other user devices 303 may provide the feedback data directly to the feedback module 130. In other implementations, the other user devices 303 may provide 311 the feedback data to the service provider datastore 140, and the feedback module 130 may access 312 the feedback data from the service provider datastore 140.

According to some embodiments, the feedback module 130 may provide 314 the feedback data to the subtitles module 132. Upon receipt, the subtitles module 132 may generate and/or otherwise determine, based at least in part on the feedback data, subtitles activation data. As previously discussed, the subtitles activation data may indicate one or more portions of the video for which subtitles are to activated and/or displayed. The subtitles activation data may be configured to transmit 316 the subtitles activation data to the video module 128. As such, the video module 128 may be configured to transmit 318 the video and its associated subtitles activation data to the user device 102. The user device 102 may be configured to play the video and activate subtitles during playback of the video in accordance with the subtitles activation data.

In some implementations, the user device 102 may also receive input 320 from a remote control device 142, such as subtitle replay selection. In response, the user device 102 may restart playback of the video at a previous position before the current position in the video. Furthermore, the user device 102 may be configured to activate subtitles during the playback restart from the previous position. In addition, the user device 102 may deactivate the subtitles after a predetermined amount of playback time.

Figure 4:
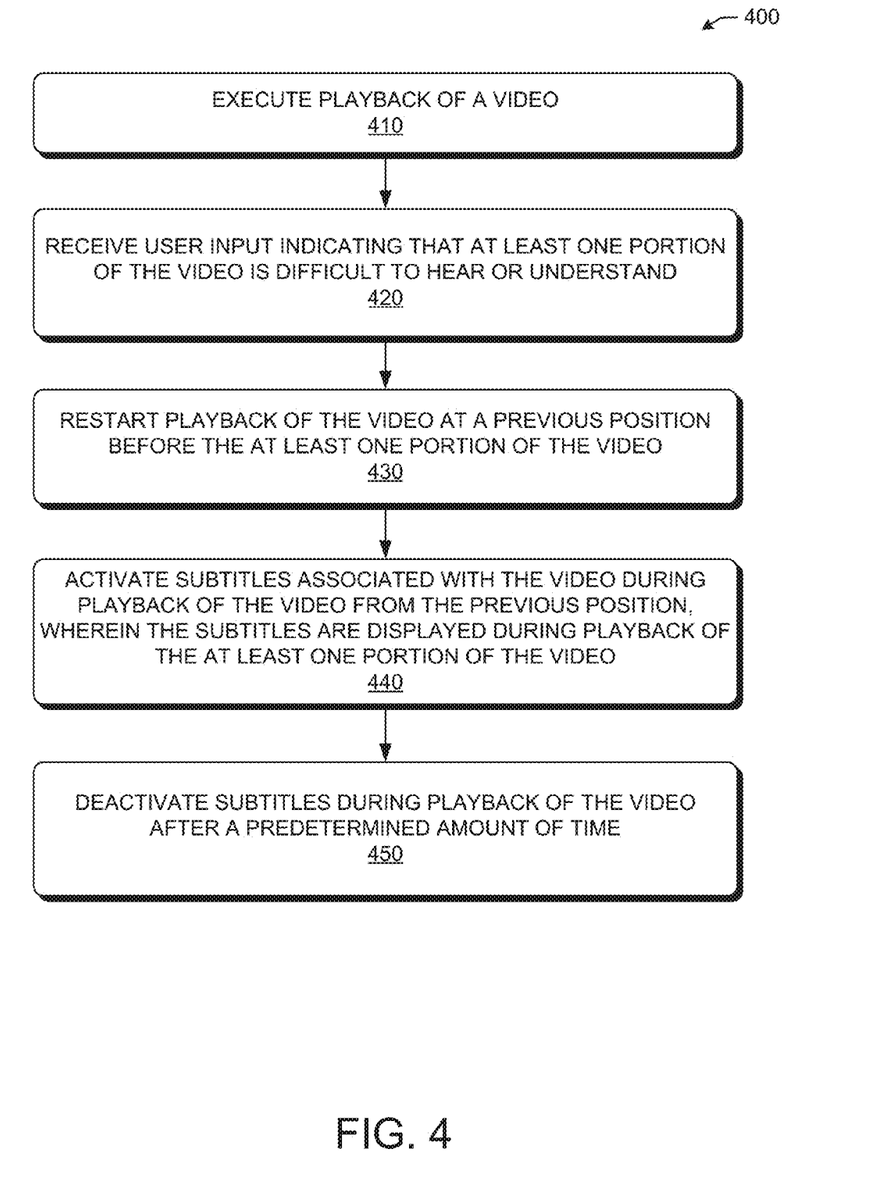
FIG. 4 illustrates a flow diagram for activating subtitles in accordance with one or more embodiments of the disclosure.

Referring now to FIG. 4, a flow diagram of a method 400 for activating subtitles is illustrated according to one or more example embodiments. The method 400 may begin in block 410, where a computer (e.g., a user device 102 and/or service provider server 118) may execute playback of a video. In block 420, the computer may receive user input indicating that at least one portion of the video is difficult to hear or understand.

In block 430, the computer may restart playback of the video at a previous position before the at least one portion of the video. In block 440, the computer may activate subtitles associated with the video during playback of the video from the previous position. The subtitles may be displayed during playback of the at least one portion of the video. In block 450, the computer may deactivate subtitles during playback of the video after a period of time has elapsed.

Figure 5:
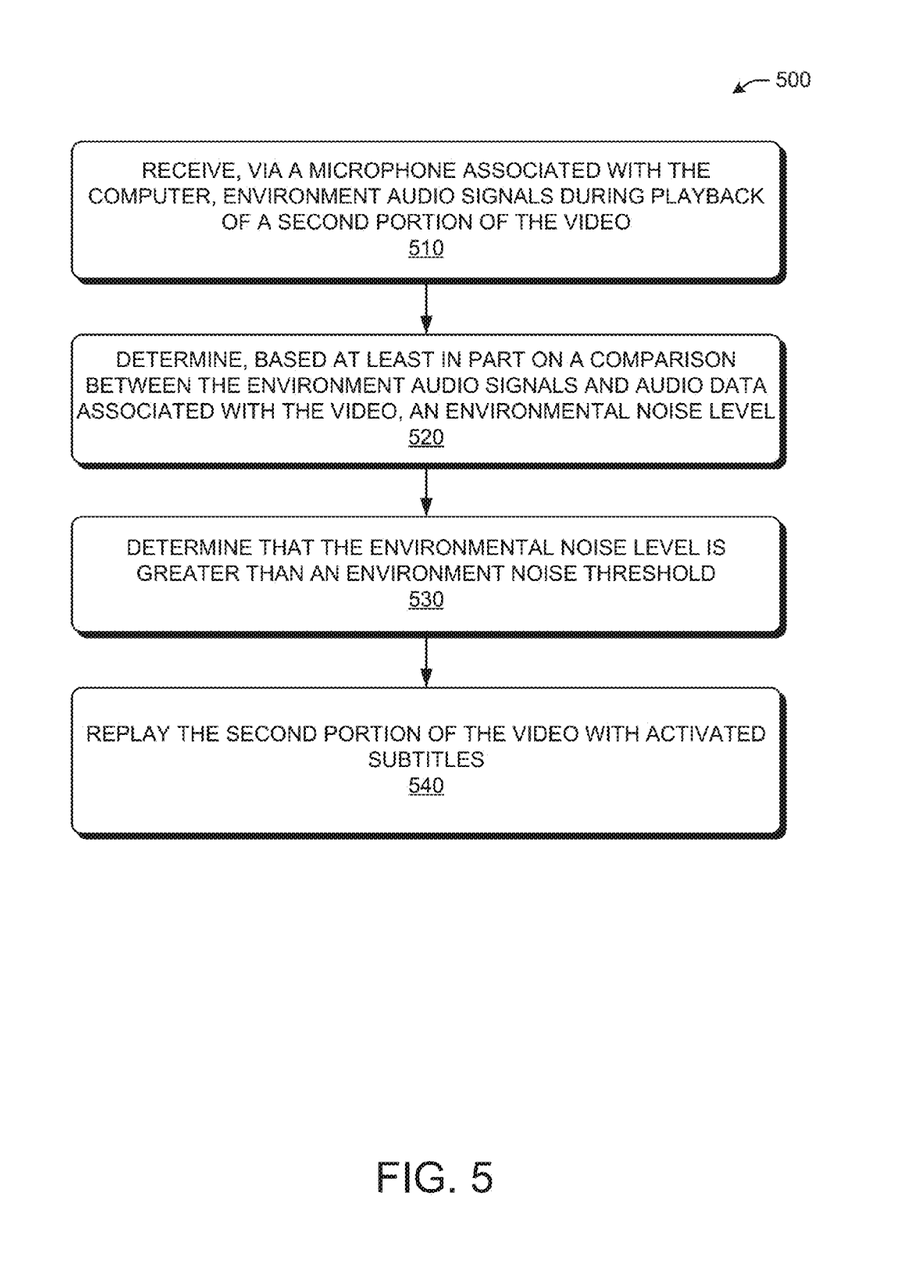

Referring now to FIG. 5, a flow diagram of another method 500 for activating subtitles is illustrated according to one or more example embodiments. The method 500 may begin in block 510 where a computer (e.g., a user device 102 and/or the service provider server 118) may receive, via a microphone associated with the computer, environment audio signals during playback of a second portion of the video.

In block 520, the computer may determine based at least in part on a comparison between the environment audio signals and audio data associated with the video, an environmental noise level. In block 530, the computer may determine that the environmental noise level is greater than (or greater than or equal to) an environment noise threshold. Furthermore, in block 540, the computer may replay the second portion of the video with activated subtitles.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The invention claimed is:

1. A method, comprising:
   executing, by one or more computers comprising one or more processors, playback of a video;
   performing, by the one or more computers, automatic speech recognition on audio data corresponding to a portion of a video, the portion of the video having a start position;
   determining, by the one or more computers, that there is a difference between a text output of the automatic speech recognition and subtitle transcript data indicative of subtitles corresponding to the portion of the video;

determining an ambient noise level using one or more microphones in communication with the one or more computers;
determining that the ambient noise level exceeds a threshold amount of ambient noise;
receiving, by the one or more computers during playback of the portion of the video, data comprising an input command to rewind the video from a first position of the video;
causing, by the one or more computers, playback of the video with subtitles at a second position of the video, the second position before the first position;
determining that the ambient noise level is less than the threshold amount of ambient noise; and
cancelling presentation of the subtitles based at least in part on the determination that the ambient noise level is less than the threshold amount of ambient noise.

2. The method of claim 1, wherein the input command comprises a press of a physical button, a touch on a touch screen, or a voice command processed using automatic speech recognition.

3. The method of claim 1, further comprising:
determining, based at least in part on video data associated with the video, that one or more textual images are to be displayed in a first display area during playback of a second portion of the video; and
displaying second subtitles corresponding to the second portion of the video in a second display area different from the first display area during playback of the second portion of the video.

4. The method of claim 1, wherein the data comprising the input command is second data for a second input command, the method further comprising:
receiving, by the one or more computers during playback of the portion of the video, first data comprising a first input command to rewind the video, wherein the first data is received before the second data.

5. A system, comprising:
at least one processor; and
at least one memory storing computer-executable instructions, that when executed by the at least one processor, cause the at least one processor to:
cause presentation of a first portion of a video without subtitles;
receive an indication to rewind the first portion for a length of time;
determine, using one or more microphones after receiving the indication, that an ambient noise level exceeds a threshold amount of ambient noise;
determine, based at least in part on the indication and the ambient noise level, that first subtitles are to be activated during replay of a portion of the video for at least a portion of the length of time;
replay the portion of the video with the first subtitles for at least the portion of the length of time;
determine that the ambient noise level is below the threshold amount of ambient noise; and
cancel presentation of the first subtitles based at least in part on the determination that the ambient noise level is below the threshold amount of ambient noise.

6. The system of claim 5, wherein the computer-executable instructions, when executed by the at least one processor, further cause the at least one processor to:
determine, based at least in part on video data associated with the video, that one or more images are to be displayed in a first display area during replay of the portion of the video; and
cause second subtitles corresponding to the portion of the video to be displayed in a second display area during replay of the portion of the video.

7. The system of claim 5, wherein the computer-executable instructions, when executed by the at least one processor, further cause the at least one processor to:
determine a volume level of audio presented during replay of the first portion; and
determine that the volume level is at or below a volume threshold.

8. The system of claim 5, wherein the computer-executable instructions, when executed by the at least one processor, further cause the at least one processor to:
determine that a volume level of audio presented during replay of the first portion was increased at least once.

9. The system of claim 5, wherein the computer-executable instructions, when executed by the at least one processor, further cause the at least one processor to determine the ambient noise level by using acoustic echo cancellation to remove audio data associated with the first portion of the video from ambient noise data received via the one or more microphones.

10. One or more non-transitory computer readable media comprising computer-executable instructions that, when executed by at least one processor, cause the at least one processor to:
determine, during playback of a video from a first position of the video, that an ambient noise level exceeds a threshold amount of ambient noise;
initiate playback of the video at a second position of the video, the second position before the first position;
activate, based at least in part on the ambient noise level, first subtitles associated with the video during playback of the video for at least a portion of time from the second position to the first position;
determine that the ambient noise level is below the threshold amount of ambient noise during playback; and
deactivate the first subtitles based at least in part on the determination that the ambient noise level is below the threshold amount of ambient noise.

11. The one or more computer readable media of claim 10, wherein the computer-executable instructions, when executed by the at least one processor, further cause the at least one processor to:
access subtitle activation data associated with the video;
determine, based at least in part on the subtitle activation data, that the first subtitles are to be activated during presentation of a first portion of the video;
cause a second portion of the video before the first portion to be presented without second subtitles corresponding to the second portion; and
cause the first portion to be presented with the first subtitles after the determination that the ambient noise level exceeds the threshold; and
cause a third portion of the video after the first portion to be presented after deactivating the first subtitles.

12. The one or more computer readable media of claim 11, wherein the subtitle activation data comprises data indicating that an increase in a volume level of audio output associated with the video is greater than or equal to a volume increase threshold, and wherein the at least one processor determines that the first subtitles are to be activated based at least in part on the volume level being greater than or equal to the volume increase threshold.

13. The one or more computer readable media of claim 10, wherein the computer-executable instructions, when executed by the at least one processor, further cause the at least one processor to:
- determine, based at least in part on video data associated with the video, that one or more images are to be displayed in a first display area during playback of a portion of the video; and
- cause the first subtitles corresponding to the portion of the video to be displayed in a second display area during playback of the portion of the video.

14. The method of claim 1, further comprising determining that the playback of the video with the subtitles has reached the first position, wherein the presentation of the subtitles is cancelled based at least in part on the determination that the playback of the video with the subtitles has reached the first position.

15. The method of claim 1, further comprising determining a number of input commands to rewind the video during the portion.

16. The system of claim 5, wherein the instructions further cause the at least one processor to determine that the portion of the video has been replayed for at least the length of time, and wherein the presentation of the first subtitles is cancelled based at least in part on the determination that the portion of the video has been replayed for at least the length of time.

17. The system of claim 5, wherein the instructions further cause the at least one processor to determine a number of indications to rewind the first portion.

18. The one or more computer readable media of claim 10, wherein the instructions further cause the at least one processor to determine that the playback of the video with the first subtitles has reached the first position, and wherein the first subtitles are deactivated based at least in part on the determination that the playback of the video with the first subtitles has reached the first position.

19. The one or more computer readable media of claim 10, wherein the instructions further cause the at least one processor to determine a number of indications to rewind the video from the first position.

* * * * *